June 1, 1965
A. STRICKLER
3,186,800
AUTOMATIC TITRATOR
Filed Feb. 27, 1961
2 Sheets-Sheet 2
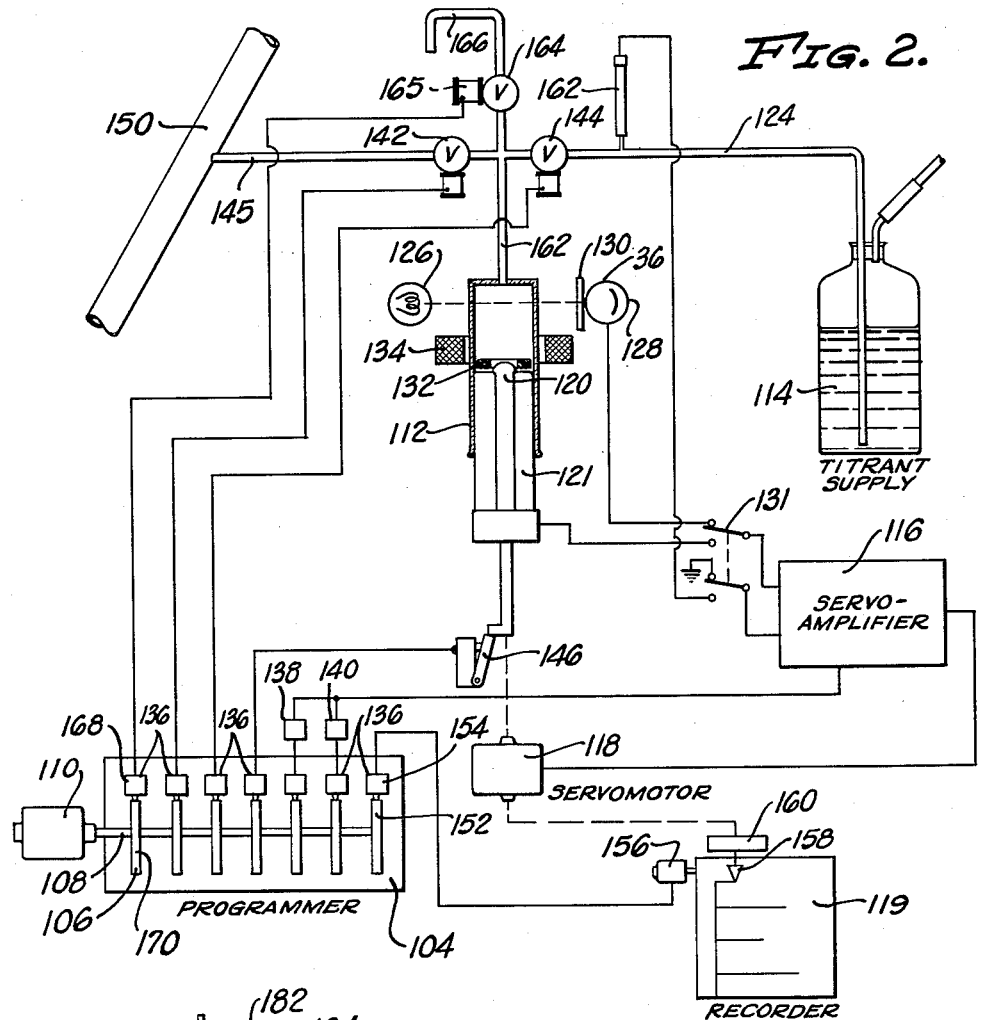
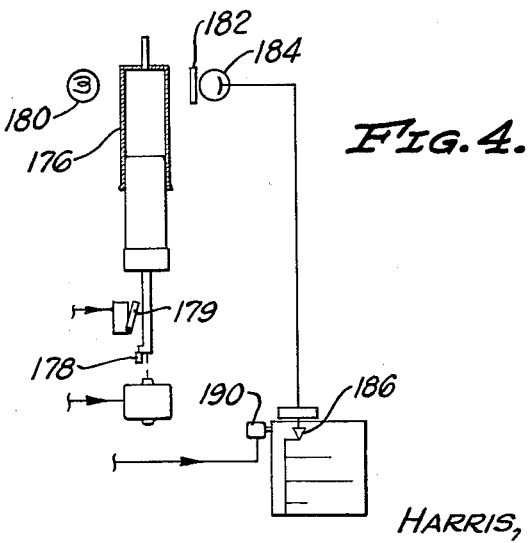
INVENTOR
ALLEN STRICKLER
BY HIS ATTORNEYS
HARRIS, KIECH, RUSSELL & KERN 3,186,800
AUTOMATIC TITRATOR
Allen Strickler, Fullerton, Calif., assignor to Beckman Instruments, Inc., a corporation of California
Filed Feb. 27, 1961, Ser. No. 92,030
12 Claims. (Cl. 23—253)

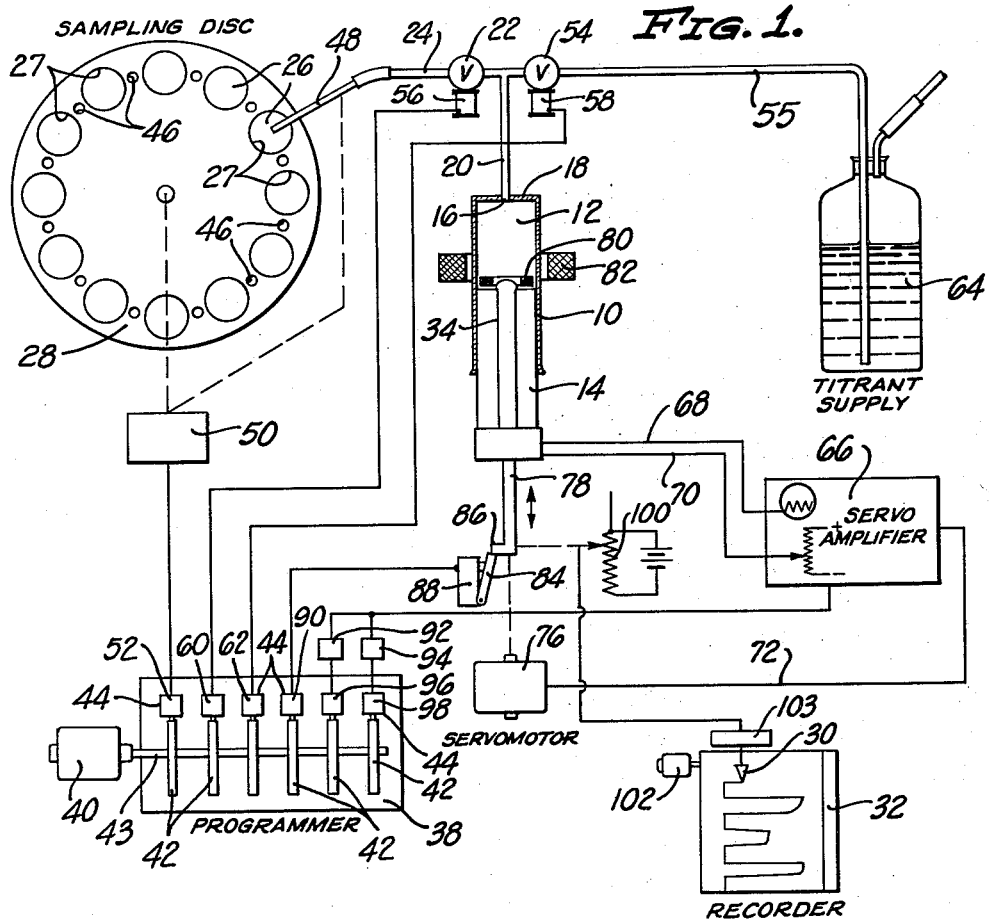

This invention relates to laboratory analysis and more particularly provides an improved technique and analysis apparatus for the determination of the quantitative amount of a constituent present in a sample. Analysis of this type depends upon a chemical reaction taking place in the sample upon the addition of an additive liquid.

One of the more important of the so-called wet chemical quantitative techniques is that of titration. In this technique, a sample solution containing an unknown concentration of a constituent is reacted with a solution (a standard titrant) having a reactant of a known concentration. One of the solutions, usually the unknown sample, is first measured out in a specified amount, e.g. by volume, then the other, normally the titrant, is added gradually until an end point, e.g., a point of chemical equivalence, is attained. The end point may be indicated by a colorimetric indicator which, for example, changes from yellow to blue at the end point, or by a pH meter or other electrometric method. The amount of titrant required to reach the end point is a measure of the amount of the constituent of interest in the sample solution, hence the sample concentration, this concentration being sometimes described as the titer of the sample solution and designated in units of normality.

Another technique sometimes used is the technique of colorimetry. In the latter technique, a colorimetric agent in a known amount is added to a measured volume of the sample. A color develops in the mixture, the intensity of which is a measure of the concentration of the constituent in interest. The intensity of the color may be determined or measured photoelectrically.

When titrations are conducted manually, the means commonly used to dispense the standard titrant is a burette, i.e., a calibrated glass tube emptied by gravity into a beaker containing the sample solution. This arrangement has sometimes been employed in automatic titrators as well. In one type of automatic instrument, the titrant is dispensed dropwise and the drops are counted, for example, photoelectrically. The foregoing approaches when incorporated in an automatic system have the shortcoming of not providing a direct or convenient means for recording the volume of titrant being dispensed. For this reason, positive displacement systems have been favored wherein, for example, the same mechanical drive that propels the displacement device may directly drive a recorder pen. A syringe, either of piston or plunger type, is especially suitable for use in a positive displacement system because of its relative accuracy, its linearity, and convenience of readout. The syringe is also adaptable to handling a variety of corrosive solutions. Titration ordinarily involves the steps of pipetting (volumetric dispensing) of the sample solution, the dispensing of the titrant into the sample solution to reach an end point, quantitative indication or recording of titrant volume dispensed, and lastly discarding of the titration mixture. Certain of the titrators (titration systems) designated as "automatic" have in fact been adapted only to perform the dispensing step automatically; others are capable only of the dispensing step and the recording step. Although a few automatic titrators have been developed that perform all four steps, they have invariably been instruments of great complexity and cost. Typically such fully automatic instruments employ a first volumetric device to dispense the sample into a titrating vessel, a second such device to meter out the titrant to the vessel with the latter volumetric device being coupled to a recorder, and some additional means for emptying the titration mixture from the vessel.

The improved technique and apparatus of the invention automate all four of the foregoing titration steps. The apparatus of the invention utilizes a single syringe or other positive displacement device and its associated drive to achieve pipetting, dispensing of titrant, recording and discarding of the titration mixture. A further important advantage lies in the inherent feature of the apparatus of preventing all access of air to the sample being titrated. Thus, adverse effects of carbon dioxide or moisture absorption, moisture evaporation, and atmospheric oxidation are forestalled.

The improved chemcial analysis method of the invention relates to the type employing two liquids including a sample liquid and an additive liquid, which two liquids upon mixing produce a measurable state. An example of such a chemical analysis involves a titration to determine for instance the quantity of sulfuric acid in a solution by introducing a solution of sodium hydroxide of known concentration until the neutral point (end point) is reached. This end point is shown by an indicator such as bromthymol blue, which changes from red to blue-green as the end point is reached, or by a pH meter indicating pH 7.0 at the end point. Knowledge of the amount of sodium hydroxide required permits a simple calculation of the sulfuric acid content. In the process of the invention a volume of one of the two liquids is admitted into a positive fluid displacement device by actuation of the device in an intake direction, the extent of the dispalcement being a measure of liquid volume admitted. With further actuation of the device in the intake direction a volume of the other one of the two liquids is admitted, the extent of the continued actuation being a measure of the quantity of the second liquid admitted to the device. The volumes of the two liquids are permitted to mix, either possibly by entry of the second liquid or preferably by an active agitation. The additive liquid and the sample liquid react to produce a measurable state. The measurement of the resulting state is achieved with the mixture still contained within the device. This manner of measuring without transfer to another device is a particularly useful feature of the invention. The measurement may comprise an electrometric measurement such as a pH determination by pH meter or, where the improved method is being employed as a colorimetric technique, the measurement step comprises a determination of an optical absorption characteristic of the mixture, e.g., a measurement of intensity of the color of the sample solution. Following the measuring step the device is actuated for displacement in an exhaust direction to eject the mixture therefrom.

In a preferred embodiment of the chemical analysis method of the invention where it is employed as a method of titration there is a continuous mixing of the liquid content contained within the device during the second portion of the fluid intake, i.e., during the admission of the second fluid. There is also a continuous measurement of a property of the mixed fluids during the latter fluid intake for sensing and indicating the arrival of the liquid mixture at a chemical equivalence point. For example, in the instance of the sulfuric acid-sodium hydroxide example described above, the chemical equivalence point occurs at neutrality or pH of 7.0, which may be sensed by a suitable pH measuring device or by an optical device capable of detecting incipient formation of color where a pH indicator has been employed. In one embodiment of the method of the invention, introduction of the second liquid is discontinued when the chemical equivalence point is reached.

The chemical analysis apparatus of the invention includes a positive fluid displacement device having a chamber providing an analysis space and a piston movable therein. Means are provided for admitting a first liquid to the chamber with movement of the piston in an intake direction, along with means for admitting a second liquid to the chamber with further movement of the piston in the intake direction while blocking admission of the first fluid. A sensing means associated with the chamber analyzes a condition, for example color intensity or hydrogen ion concentration, of the contents of the chamber. Means are also provided for substantially exhausting the chamber of its liquid content with movement of the piston in an exhaust direction. Preferably, the chemical analysis apparatus comprises a syringe means including a slidable plunger means and an analysis chamber contained within the syringe means having for one of its end walls the movable plunger means. The syringe means carries port means for admitting fluid into and exhausting fluid from the analysis chamber with actuation of the plunger means. Means are also provided for indicating the plunger means travel and thereby the volume of fluid admitted to the analysis chamber. A conduit means couples the aforementioned port means to sources of two different liquids provided externally of the syringe, one of the liquids being a sample solution, the other a reactant solution or titrant. The manifold means includes a valve means adapted to admit one of the liquids into the analysis chamber during an initial portion of the intake stroke of the plunger means while excluding the other one of the two liquids, and in a following portion of the intake stroke the valve means admits the second liquid while excluding the first liquid. The valve means upon an exhaust stroke of the plunger means permits discharge of the contents of the analysis chamber.

The foregoing objects and advantages of the technique and apparatus of the present invention, together with various other objects and advantages which will be evident to those skilled in the art in light of this disclosure, may be achieved with the exemplary embodiments of the invention described in detail hereinafter and illustrated in the accompanying drawings.

In the drawings:

FIG. 1 is a schematic representation of a preferred embodiment of a chemical analysis apparatus of the invention taking the form of a syringe and employing a sampling disc carrying several sample beakers and utilizing as a sensing means a combination glass-and-reference electrode (for pH end point detection) built into a plunger of the syringe;

FIG. 2 is a schematic representation of another form of the chemical analysis apparatus of the invention provided with an alternative sensing means comprising a photoelectric cell and with a sample line connecting directly to a process stream thus affording continual surveillance of the stream;

FIG. 3 is a modification employing a recorder which draws a titration curve showing electrode signal versus volume of titrant added, differing from the recorders of FIGS. 1 and 2 which record plunger motion rather than the electrode potential of an electrometric sensing device; and FIG. 4 is a schematic view of still another modification of the chemical analysis apparatus of the invention adapted to use in a colorimetric technique.

With reference to the drawings, and in particular FIG. 1, the apparatus of the invention is seen to be built around a syringe 10. The syringe 10 serves as a titration vessel with a sample being metered into the analysis chamber or titration space 12 of the syringe by an intake stroke effected by downward movement of a plunger 14. The sample enters through a port 16 in an end wall 18 of the syringe 10 via a feed line 20, valve 22 in its open position and sample line 24 from a sample beaker 26 which is one of several such beakers carried by a sampling disc 28. A second liquid, a standard titrant, is gradually added to the analysis chamber 12 by continuing the intake stroke while a recorder pen 30 of a recorder 32 records this second portion of the intake stroke in a fashion described in greater detail hereinafter. The mixture of the two liquids upon completion of the titration or other analysis is expelled by an exhaust stroke achieved by upward movement of the plunger 14 toward the end wall 18. A sensing means 34 may be built into the syringe, e.g., may be embodied in the plunger 14, as illustrated in FIG. 1, or may be external to the syringe, as in a photoelectric arrangement 36 (FIG. 2) that directs a beam of light through the wall of the syringe (glass or other suitable transparent material in this instance).

As illustrated in FIG. 1, a programmer 38 driven by a synchronous motor 40 times and coordinates the complete operating cycle. The programmer 38 may, as shown, comprise an array of cams 42 actuating a corresponding number of switches 44. The cams 42 which are carried by a cam shaft 43 are adjustable to tailor the program to the needs of any particular titration.

The apparatus illustrated in FIG. 1 is of a type adapted to analyze discrete samples, and to this end the sampling disc 28 in the form of a turntable is provided. The sampling disc is provided with a series of peripheral recesses or openings 27 in which the sample-containing beakers 26 are carried. The recesses 27 alternate with openings 46 through which the spent titrating mixture may be discharged to a common waste conduit. An aspirator tube 48 at the outer end of the sample line 24 is so mounted that it may be lowered into or lifted out of any of the beakers 26 or discharge openings 46 positioned beneath it. The aspirator tube 48 and the sampling disc 28 are driven by a sampler actuator 50. When energized by closing of a switch 52 of the programmer 38, the sample actuator 50 raises the aspirator tube 48, advances the sampling disc 28 by one step (that is, from a beaker 26 to a discharge opening 46, or from a discharge opening to a next beaker), then lowers the aspirator tube. Valve 22 in the sample line 24 and its companion valve 54 in a titrant line 55 are of an on-off type having no intermediate positions and characterized by small internal dead space. The valves 22 and 54 are actuated respectively by means 56 and 58, for example electromechanical actuators operable on closing of respective switches 60 and 62 of the programmer 38. The actuating means 56 and 58 may more particularly take the form of solenoids connected with suitable mechanical linkages to the two valves 22 and 54. The titrant flows through the titrant line 55 from a titrant supply container 64.

The titration is carried out inside the syringe 10, employing the sensing means 34 to detect the pH end point. In the particular embodiment illustrated in FIG. 1 the sensing means 34 takes the form of a combination glass-and-reference electrode of known design built into the plunger 14. Various other known types of electrodes, for example a combination type employing a metallic indicating element or various bi-metallic types of electrodes, may be embodied in the plunger 14. Another possible embodiment involves mounting the electrode in the wall of the analysis chamber 12 or in the end wall 18 of the syringe 10. A signal from the sensing means or electrode 34 is applied to the input of a servoamplifier 66 via lines 68 and 70. The servoamplifier 66 connects through a line 72 to a servomotor 76. The speed with which the servomotor 76 turns is dependent upon the magnitude of the signal from the servoamplifier 66. The servomotor 76 is mechanically linked to a plunger rod or drive member 78 which is an extension of the plunger proper 14.

Means are provided for stirring the contents of the syringe 10 during titration. In the particular embodiment illustrated stirring means takes the form of a Teflon (tetrafluoropolyethylene) coated magnetic ring 80 lying within the syringe 10, together with an external actuating means such as a permanent magnet or electromagnet 82 which may be oscillated up and down outside the syringe 10. Where an electromagnet is employed, the power to the electromagnet may be alternately turned on and off, driving the internal ring 80 up and down. The apparatus of FIG. 2 has a similar mixing means.

To limit the stroke of the plunger 14 on the sample-admitting portion of the intake stroke, a retractable stop 84 is provided, which stop engages an outwardly extending projection or tab 86 of the plunger rod 78. On commencing the titration portion of the intake stroke, the stop 84 is drawn free of the tab 86 by means of electromagnetic actuator 88 which is energized by closing of a programmer switch 90. It will be seen that on the discharge stroke, the tab 86 may ride freely past the stop 84 in the upward direction.

If the servomotor 76 and its associated mechanical linkage connecting the motor to the plunger rod 78 have no tendency to coast, a contact-operated switch such as a microswitch may replace the retractable stop 84, the contact-operated switch being opened to stop the servomotor at a given position of the plunger rod 78.

It is desirable, during the sample-admitting portion of the intake stroke and during the discharge stroke, that the plunger 14 be driven at maximum speed in the downward and upward directions respectively. Accordingly, in the preferred embodiment of the apparatus of the invention, during these two portions of the cycle, the input to the servoamplifier 66 is altered by selectively inserting electrical biasing means 92 or 94 through the closing respectively of programmer switches 96 and 98. The electrical biasing means 92 and 94 apply relatively large signals to the servoamplifier, respectively in the downgoing and upgoing directions, with the result that the normal electrode signal from the sensing means 34 is swamped out, and the servoamplifier 66 is driven at saturation level to propel the servomotor 76 and hence the plunger 14 at maximum velocity.

It will be appreciated that the servoamplifier 66 during the titration portion of the cycle provides a varying signal to the servomotor. The titrant intake speed (and the velocity of the plunger) is high during the early portion of the titration when the error signal is large and diminishes gradually to zero or near-zero velocity as the titration end point is reached. A desirable provision prevents reversal of the servomotor 76 in the event of reversal of polarity of the servo input signal. Thus, with this latter arrangement should a slight overshoot of the end point occur, the titration mixture will not be driven toward or into the titrant supply 64. The cut-off of the servomotor 76 on reversal of the driving signal may be provided by suitable phase-sensitive relay means in the servoamplifier 66.

In order to record the titer or normality of successive samples, the recorder pen 30 follows or is driven in common with the plunger rod 14 during the second or titration portion of the intake stroke. Where the pen 30 is mechanically coupled to the plunger 14, it is desirable, in order not to record the initial or sampling portion of the intake stroke, to provide a mechanical biasing device which serves to delay upscale actuation of the pen until the titration phase of the stroke has started. As an alternative and as illustrated in FIG. 1, an electrical coupling placed between the syringe 10 and recorder pen 30 comprising a potentiometer 100 driven by the plunger rod 78 serves the same purpose, the potentiometer giving an output voltage proportional to plunger travel during the titration phase. The voltage output of the potentiometer 100 may be recorded by conventional recording means including a pen-activating servomechanism 103.

Succeeding titrations are presented on the chart of the recorder 32. The height of each segment of the curve represents the sample titer, i.e., the normality of the particular sample solution as determined by titration with the standard titrant. The chart of the recorder 32 is driven at a constant speed by a motor 102.

The following is an operational sequence which the chemical analysis apparatus of FIG. 1 may employ. Following a previous titration, the plunger 14 is in its extreme upward position and the sampling disc 28 is in a discharge position with the aspirator 48 in one of the discharge openings 46. The valve 22 is open and value 54 is closed. The programmer 38 acts to close switch 52 for a period sufficient to advance the next sample beneath the aspirator tube 48. Switch 96 then closes to drive the plunger 14 through the first portion of its intake stroke, this switch staying closed at least long enough for the plunger rod 78 to strike stop 84. The programmer acts to close switch 60 thus closing valve 22, to open switch 62 thus opening valve 54, to close switch 90 (this may be momentary) thus retracting the stop 88, to open switch 96 which results in the application of electrode potential of the sensing means 34 only to the servoamplifier 66. The relative order of the immediately foregoing steps, which may be approximately simultaneous, may vary somewhat. The several switches stay in the foregoing state long enough to allow the longest expected titration to be completed. A record of the titer is drawn during this stage.

The switch 52 again closes, this time long enough to raise the aspirator tube 48, advance the sampling disc 28 one position and again lower the tube, this time into one of the discharge openings 46. The switch 60 is next opened, thus effecting an opening of valve 22 and switch 62 closes bringing about a closing of valve 54. The switch 98 closes, thus causing the servoamplifier 66 to drive in the reverse direction for discharge of the mixture from the syringe chamber 12. The switch 98 stays closed at least long enough to complete the discharge.

The chemical analysis apparatus of FIG. 2, while generally resembling that of FIG. 1, differs in several major ways. The apparatus of FIG. 2 includes a programmer 104 provided with a bank of cams 106 mounted on a drive shaft 108 of a motor 110 and a syringe 112 formed of glass, a titrant supply 114, a servoamplifier 116, a servomotor 118 and a recorder 119.

The syringe 112 has both an electrode 120 for pH end point detection (mounted in a plunger 121) and the earlier mentioned photoelectric arrangement 36 which may be employed for end point detection in the place of the pH electrode. A reference electrode 122 having a liquid junction (for example a calomel electrode) is conveniently connected to a titrant stream 124. An advantage in such a connection is that the exit side of the liquid junction of the reference electrode 122 will not be subjected to higher than atmospheric pressure; consequently there is no hazard of reversed flow through the liquid junction. The photoelectric arrangement 36 is made up of a light source 126 and a photoelectric detector 128 placed diametrically opposite the light source 126, both being exterior to the glass walled syringe 112. The photoelectric detector 128 may be proved with a suitable filter means 130. When the photoelectric arrangement is employed rather than the pH electrode 120 to detect the end point, an end point indicator is incorporated in the titrant. The end point indicator changes color at the desired end point, the change in color of the solution in the syringe chamber being readily sensed by the photoelectric detector 128, and a signal indicating approach and final arrival at the end point is applied to the input of the servoamplifier 116. When the photoelectric arrangement is being used switch 131 is in the position indicated and when the pH electrode 120 is utilized switch 131 occupies its other position connecting the electrode 120 to the servoamplifier 116.

A magnetic ring 132 energized by a magnet 134 stirs the contents of the syringe in the fashion described earlier. Electrical biasing means 138 and 140, valves 142 and 144, and stop 146 all act in the fashion described above in the discussion of the apparatus of FIG. 1. The apparatus of FIG. 2 is designed to analyze a process stream 150 and hence the sampling disc 28 of the apparatus of FIG. 1 is not required. Instead the intake valve 142 is connected directly to the process stream via line 145 and samples are withdrawn at predetermined fixed intervals for titration.

The manner of recording the titration graph of recorder 119 differs somewhat from that earlier described in that the present graph takes the form of a bar graph; that is, a single line extending in the ordinate direction is drawn for each titration, the heights of these lines representing the several sample titers. An extra cam 152 is provided on the programmer 104 to actuate a switch 154. The switch 154 serves to turn off a recorder drive motor 156 during the titration portion of the intake stroke, and to keep it off until the discharge stroke reaches at least the initial titration position.

Recorder pen 158 in the embodiment of FIG. 2 is mechanically coupled via the servomotor 118 to move with the plunger 121 of the syringe 112. In order not to record the initial or sampling portion of the intake stroke, a mechanical biasing means 160 is provided which serves to delay upscale actuation of the pen until the titration portion of the stroke has started.

On intake of a sample, both in the instance of the apparatus of FIG. 1 and FIG. 2, a residual volume of the previously titrated mixture remains in the feed line 20 (FIG. 1) or in a corresponding feed line 162 of FIG. 2 and is drawn into the syringe with the new sample. This is not objectionable, since the residual volume, being already titrated to the end point, causes no error in the following titration. In any event, the feed lines 20 and 162 may be made of capillary tubes, reducing their volumes to a negligible amount compared with the syringe volumes. An alternative venting arrangement is illustrated in FIG. 2 which includes a valve 164 and a discharge line 166 opening into the feed line 162 between the two valves 142 and 144. With this venting arrangement the titrated mixture need not be returned to the process line 150. A switch 168 and cam 170 of the programmer 104 actuate valve 164 through a solenoid 165.

FIG. 3 illustrates the modified parts of the chemical analysis apparatus of the invention adapted to draw a titration curve for each successive sample, i.e., a curve showing electrode signal or pH versus volume of titrant added. The electrode potential or photoelectric signal is recorded via a pH meter or preamplifier 173 on the graph of a recorder 171 by a recorder pen 172, the latter being driven by the pen servo 175. The titration phase of the intake stroke may be continued past the end point to some predetermined plunger position or potential value. In this modification a controller-amplifier 174 may be used to give variable chart speed, but could, if desired for reasons of lower cost, be eliminated and a constant speed drive used. However, such a controller-amplifier 174 provides greater speed for a given accuracy of recording by being adapted to drive the syringe (and chart) at a rate dependent on the rate of change, or slope, of the electrode signal. Thus, the titrant delivery would be slowest in the region of the equivalence point where the slope is greatest, and would be much faster both before and after the equivalence region.

FIG. 4 is a partial schematic of the apparatus of the invention adapted for use in colorimetry. In this technique the titrant is replaced by a colorimetric reagent, e.g., orthotolidene in the determination of dissolved chlorine, and a fixed volume of the reagent is taken into syringe 176 during the second portion of the intake stroke. The apparatus of FIG. 4 is like that of either FIG. 1 or FIG. 2, differing in the respect illustrated. The servomechanism of the preceding designs is eliminated and a second stop means 178 is used to limit the colorimetric reagent intake. It will be seen that there is provided a first stop means 179 like that used in the apparatus of FIGS. 1 and 2. The detection method of the apparatus of FIG. 4 is photoelectric comprising a light source 180, a filter 182 and a detector 184. Since a photoelectric method is used for detection the walls of the syringe are made of glass or other suitable transparent material. The value recorded by recorder pen 186 is the intensity of color developed in the liquid mixture contained in the syringe 176, rather than the extent of the plunger stroke. A recorder drive motor 190 operates intermittently as in the apparatus of FIG. 2.

In the embodiments of FIGS. 1 and 2 of the invention previously described, initiation of discharge of the titrated sample from the syringe, instead of occurring at fixed intervals following initiation of titration, could be started immediately on completion of each titration. This would require a triggering and discharge cycle when the error signal fed to the servoamplifier has been reduced to a predetermined minimum value.

Although exemplary embodiments of the invention have been disclosed herein for purposes of illustration, it will be understood that various changes, modifications, and substitutions may be incorporated in such embodiments without departing from the spirit of the invention as defined by the claims which follow.

I claim:
1. A chemical analysis apparatus comprising:
a positive fluid displacement device including a chamber providing an analysis space and a piston movable therein;
means for admitting a first liquid to the chamber with movement of the piston in an intake direction;
means for admitting a second liquid to the chamber with further movement of the piston in the intake direction while blocking admission of said first liquid to cause a reaction directed toward an end point;
end point sensing means positioned with respect to said chamber to measure said end point; and
means for substantially exhausting the chamber of its contents with movement of the piston in an exhaust direction.

2. A chemical analysis apparatus comprising:
a positive fluid displacement device including a chamber providing an analysis space and a piston movable therein;
means for admitting a first liquid to the chamber with movement of the piston in an intake direction;
means for admitting a second liquid to the chamber with further movement of the piston in the intake direction while blocking admission of said first liquid;
mixing means provided within the chamber for agitation of the two liquids to cause a reaction directed toward an end point;
end point sensing means positioned with respect to said chamber to measure said end point; and
means for substantially exhausting the chamber of its contents with movement of the piston in an exhaust direction.

3. An apparatus for chemical analysis comprising:
syringe means including slidable plunger means, an analysis chamber contained within the syringe means, said analysis chamber having the slidable plunger means for one of its end walls, and port means for admitting fluid into and for exhausting fluid from said analysis chamber on actuation of said plunger means;
means for indicating the travel of the plunger means;
manifold means coupling said port means to sources of two different liquids external to said syringe means, one of said liquids being a sample, and the other a reactant, said manifold means including valve means adapted to admit the first of said liquids into said analysis chamber during an initial portion of an intake stroke of said plunger means while excluding the second of said liquids and during a following portion of said intake stroke to admit the second liquid while excluding said first liquid to cause a reaction directed toward an end joint, said valve means upon an exhaust stroke of said plunger means permitting discharge of the contents of said analysis chamber while excluding return of said contents to said reactant source;

and end point sensing means positioned with respect to said chamber to measure said end point.

4. An apparatus in accordance with claim 3 wherein the valve means admits the sample liquid via a sample intake tube during the first portion of the intake stroke and titrant during the second portion of the intake stroke.

5. An apparatus in accordance with claim 4 wherein the valve means is operable on the exhaust stroke to open the analysis chamber to the sample intake tube.

6. An apparatus in accordance with claim 3 in which the sensing means is an electrode mounted in the plunger means for determination of pH of the contents of said analysis chamber.

7. An apparatus in accordance with claim 3 in which the sensing means comprises photoelectric means for measuring changes in an optical absorption characteristic occurring in the contents of the analysis chamber.

8. An apparatus in accordance with claim 3 wherein stirring means is provided in the analysis chamber for agitation of the liquid contents.

9. An apparatus in accordance with claim 3 wherein means are provided coupled to said plunger means for limiting the admission of said first liquid to a predetermined amount together with means for continuously mixing the contents of said analysis chamber during admission of said second liquid and wherein means are provided actuated by said sensing means for indicating the extent of travel completed by said plunger means in the admission of said second liquid.

10. An apparatus in accordance with claim 9 in which said means actuated by the sensing means comprises a servomechanism including a servoamplifier driven by said sensing means and a servomotor driven by said servoamplifier, said servomechanism controlling the admission of said second liquid and terminating said admission on attainment of a predetermined condition in the chamber contents.

11. A chemical analysis apparatus comprising:
means for providing a variable volume analysis chamber;
means for admitting a first fluid into said chamber as the volume of said chamber is increased;
means for admitting a second fluid into said chamber with further increase in the volume of said chamber while admission of said first fluid is blocked during said further increase to cause a reaction directed toward an end point;
end point sensing means positioned with respect to said chamber to measure said end point; and
means for substantially exhausting said chamber of its contents as the volume of said chamber is decreased.

12. A chemical analysis apparatus comprising:
a positive fluid displacement device for providing an analysis chamber;
means operative to admit a first fluid into said chamber upon actuation of said device for displacement in an intake direction;
means operative to admit a second fluid into said chamber upon further actuation of said device for displacement in the intake direction to cause a reaction directed toward an end point;
means for alternately actuating said first and second operative means whereby first one and then the other fluid is admitted into said chamber to further adjust said end point; and
end point sensing means positioned with respect to said chamber to measure said end point.

References Cited by the Examiner
UNITED STATES PATENTS

| 2,143,041 | 1/39 | Vayda et al. | 23—25 X |
| 2,650,256 | 8/53 | Lingane | 23—253 |
| 2,782,151 | 2/57 | Suthard | 23—230 X |
| 2,879,141 | 3/59 | Skeggs | 23—230 |

MORRIS O. WOLK, *Primary Examiner.*

MAURICE A. BRINDISI, *Examiner.*